(12) United States Patent  
Olgaard

(10) Patent No.: US 8,036,617 B2  
(45) Date of Patent: Oct. 11, 2011

(54) RADIO FREQUENCY (RF) SIGNAL GENERATOR AND METHOD FOR PROVIDING TEST SIGNALS FOR TESTING MULTIPLE RF SIGNAL RECEIVERS

(75) Inventor: Christian Volf Olgaard, Saratoga, CA (US)

(73) Assignee: LitePoint Corporation, Santa Clara, CA (US)

( * ) Notice: Subject to any disclaimer, the term of this patent is extended or adjusted under 35 U.S.C. 154(b) by 441 days.

(21) Appl. No.: 12/335,241

(22) Filed: Dec. 15, 2008

(65) Prior Publication Data

US 2010/0148827 A1   Jun. 17, 2010

(51) Int. Cl.
*H04B 17/00* (2006.01)
(52) U.S. Cl. .................... 455/226.1; 455/423
(58) Field of Classification Search .......... 455/226.1, 455/423, 45, 62, 63.1, 67.11, 67.13; 375/296, 375/297
See application file for complete search history.

(56) References Cited

U.S. PATENT DOCUMENTS

| | | | |
|---|---|---|---|
| 6,687,500 B1 * | 2/2004 | Causey | 455/423 |
| 7,099,626 B2 * | 8/2006 | Peng et al. | 455/67.11 |
| 7,450,911 B1 * | 11/2008 | Venkatesh | 455/73 |
| 7,782,928 B2 * | 8/2010 | Kang et al. | 375/221 |
| 2003/0012260 A1 | 1/2003 | Walley et al. | |
| 2003/0228845 A1 | 12/2003 | Peng et al. | |
| 2005/0227642 A1 | 10/2005 | Henrik | |
| 2007/0280338 A1 | 12/2007 | Haub et al. | |

OTHER PUBLICATIONS

International Search Report for International Application No. PCT/US2009/063068, 3 pages.
Written Opinion of the International Searching Authority for International Application No. PCT/US2009/063068, 4 pages.

* cited by examiner

*Primary Examiner* — Brian Young
(74) *Attorney, Agent, or Firm* — Vedder Price P.C.

(57) ABSTRACT

A test signal interface and method for allowing sharing of multiple test signal generators among multiple devices under test (DUTs). Digital baseband test signals generated by the multiple test signal generators are combined and converted to a baseband analog signal for conversion to a radio frequency (RF) signal for testing the multiple DUTs.

19 Claims, 4 Drawing Sheets

| DUT | SIGNAL PATH LOSS (dB) | SIGNAL SOURCE POWER (dBm) | RECEIVED SIGNAL POWER (dBm) |
|---|---|---|---|
| 1 | 7.0 | -138.0 | -145.0 |
| 2 | 7.5 | -137.5 | -145.0 |
| 3 | 8.0 | -137.0 | -145.0 |
| 4 | 7.5 | -137.5 | -145.0 |

RADIO FREQUENCY (RF) SIGNAL GENERATOR AND METHOD FOR PROVIDING TEST SIGNALS FOR TESTING MULTIPLE RF SIGNAL RECEIVERS

BACKGROUND

1. Field of the Invention

The present invention relates to a system and method for testing multiple radio frequency (RF) signal receivers, and in particular, to testing multiple RF signal receivers with a shared RF signal generator.

2. Related Art

Manufacturing test of receive-only RF signal systems, e.g., global position satellite (GPS) signal receivers, is often implemented by using a single RF signal source to be shared among multiple devices under test (DUTs). Generally, this is easily done, as the signal source typically need only provide a continuous signal, plus this has the advantage of reduced costs.

Referring to FIG. 1, such a test implementation uses a common RF signal source 12 which receives one or more control signals 11 in accordance with which an output signal 13 is provided. This signal 13 is provided to a 1:N, e.g., 1:4, power splitter 14 which divides this signal 13 (in signal power) among its multiple output signals 15a, 15b, 15c, 15d, each of which serves as the test signal for a respective DUT 16a, 16b, 16c, 16d. As will be readily appreciated by one of ordinary skill in the art, such power splitters 14 are well known in the art and can be implemented with virtually any number of output signal ports, or alternatively, by cascading multiple power splitters having fewer signal ports such that the output port of an upstream power splitter provides the signal for the input port of a downstream power splitter, in accordance with well-known techniques. Accordingly, virtually any number of DUTs 16 can be tested using a single RF signal source 12.

However, particularly as an increasing number of DUTs 16 is to be tested, this type of test implementation has a number of problems relating to mutual power differences among the different signals 15 feeding the DUTs 16. In other words, ensuring that each DUT 16 receive its signal with the same power as each other DUT is not trivial. For example, the power splitter 14 will not provide each of the signals 15 at the same power level due to differences among the power divisions being accomplished within the power splitter 14 to its output signal ports 14a, 14b, 14c, 14d. Additionally, manufacturing tolerances and different lengths of the cables providing the test signals 15 will introduce further power differences among the signals 15. Hence, in order to ensure equal signal levels at the DUTs 16, adjustable signal attenuators (not shown) would need to be used and controlled externally. This adds to system costs and complicates the testing due to the external control required, as well as the calibration of each signal path (e.g., cable plus attenuator). Further, if each attenuator is not perfectly matched, i.e., in terms of the characteristic signal impedance, signal reflections can cause further differences among the power levels of the signals 15.

In the case of testing GPS signal receivers, the signal source 12 would normally be a single channel GPS signal generator. Often, it is only desired to test the signal-to-noise ratio (SNR) of each DUT 16, thereby effectively testing the noise figure of the receiver. (If a multi-channel GPS signal generator is used, with multiple signal carriers provided, the carrier-to-noise ratio (CNR) would be tested.) If the noise figure is sufficiently low and the DUT 16 can see a satellite signal at a given SNR (or CNR), it is the digital signal processing that ensures signal locking with the satellites. Since the digital signal processing is tested by the supplier of the signal processing chip (and should, therefore, be assumed to be operating properly), this is often sufficient.

On the other hand, if it is desired to test GPS location lock, an antenna located on the roof of the testing facility can be used to receive and convey actual GPS signals to the DUTs 16. However, as the GPS signals received in this manner will vary, e.g., with weather conditions, this cannot be considered a reliable signal source for testing noise figure, since the input signal level for a given satellite signal is not well defined. Accordingly, this is generally useful only as a test of the ability to determine geographic location, i.e., obtain satellite lock.

Alternatively, multi-channel GPS signal generators (e.g., four channels or more) can be used provide an accurate signal to which the DUTs 16 can lock. Conventional multi-channel GPS signal generators, however, are more expensive than single-channel generators, thereby limiting their use to more expensive manufacturing requirements where repeatable locking to GPS signals must be tested.

SUMMARY

In accordance with the presently claimed invention, a test signal interface and method are provided for allowing sharing of multiple test signal generators among multiple devices under test (DUTs). Digital baseband test signals generated by the multiple test signal generators are combined and converted to a baseband analog signal for conversion to a radio frequency (RF) signal for testing the multiple DUTs.

In accordance with one embodiment of the presently claimed invention, a radio frequency (RF) signal generator for providing a test signal to be used in testing a plurality of RF signal receivers includes:

signal generator circuitry responsive to a first plurality of digital baseband signals and a plurality of digital gain control signals by providing an analog baseband signal corresponding to a combination of the first plurality of digital baseband signals; and frequency conversion circuitry coupled to the signal generator circuitry and responsive to the analog baseband signal by providing a RF signal corresponding to the combination of the first plurality of digital baseband signals.

In accordance with another embodiment of the presently claimed invention, an analog data signal generator for providing a test data signal to be used in testing a plurality of data signal receivers includes:

a plurality of digital signal generator circuits responsive to a plurality of digital code signals by providing a first plurality of digital baseband signals;

a plurality of digital gain control circuits coupled to the plurality of digital signal generator circuits and responsive to the first plurality of digital baseband signals and a plurality of digital gain control signals by providing a second plurality of digital baseband signals, wherein ratios of respective related ones of the first and second pluralities of digital baseband signals correspond to respective ones of the plurality of digital gain control signals;

digital signal combining circuitry coupled to the plurality of digital gain control circuits and responsive to the second plurality of digital baseband signals by providing a digital combination signal related to the second plurality of digital baseband signals; and digital-to-analog conversion (DAC) circuitry coupled to the digital signal combining circuitry and responsive to the digital combination signal by providing an analog baseband signal related to a combination of the digital code signals.

In accordance with another embodiment of the presently claimed invention, a method for providing a test data signal for testing a plurality of data signal receivers includes:

receiving a first plurality of digital codes and in response thereto providing a first plurality of digital baseband signals each of which is related to a respective one of the first plurality of digital codes;

receiving the first plurality of digital baseband signals and a plurality of digital gain control signals and in response thereto providing a second plurality of digital baseband signals, wherein ratios of respective related ones of the first and second pluralities of digital baseband signals correspond to respective ones of the plurality of digital gain control signals;

combining the second plurality of digital baseband signals to provide a digital combination signal related to the second plurality of digital baseband signals; and converting the digital combination signal to one or more RF signals, wherein each of the one or more RF signals includes a plurality of RF signal components related to the first plurality of digital codes;

converting, with each one of a plurality of data signal receivers, a respective one of the one or more RF signals to a respective one of one or more converted digital baseband signals related to the digital combination signal; and decoding, with each one of a plurality of data signal receivers, a respective one of the one or more converted digital baseband signals to retrieve a respective one of the first plurality of digital codes.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

A typical GPS signal receiver receives a combined signal containing the power and data for all satellites that are "visible" to the receiver, and can identify each individual satellite and its timing and power (i.e., CNR) based on the different codes used by each satellite in the system. Multi-channel GPS signal generators are typically capable of individually controlling the power level of each simulated satellite signal with high accuracy, e.g., with 0.1 dB power resolution. Since each signal is originates from a single baseband signal and all such baseband signals are then combined into a composite signal (with all satellite signals included) which is up-converted in frequency, the relative power levels of the individual satellite signals can be very accurate, since they are controlled in the digital domain.

Figure 2:
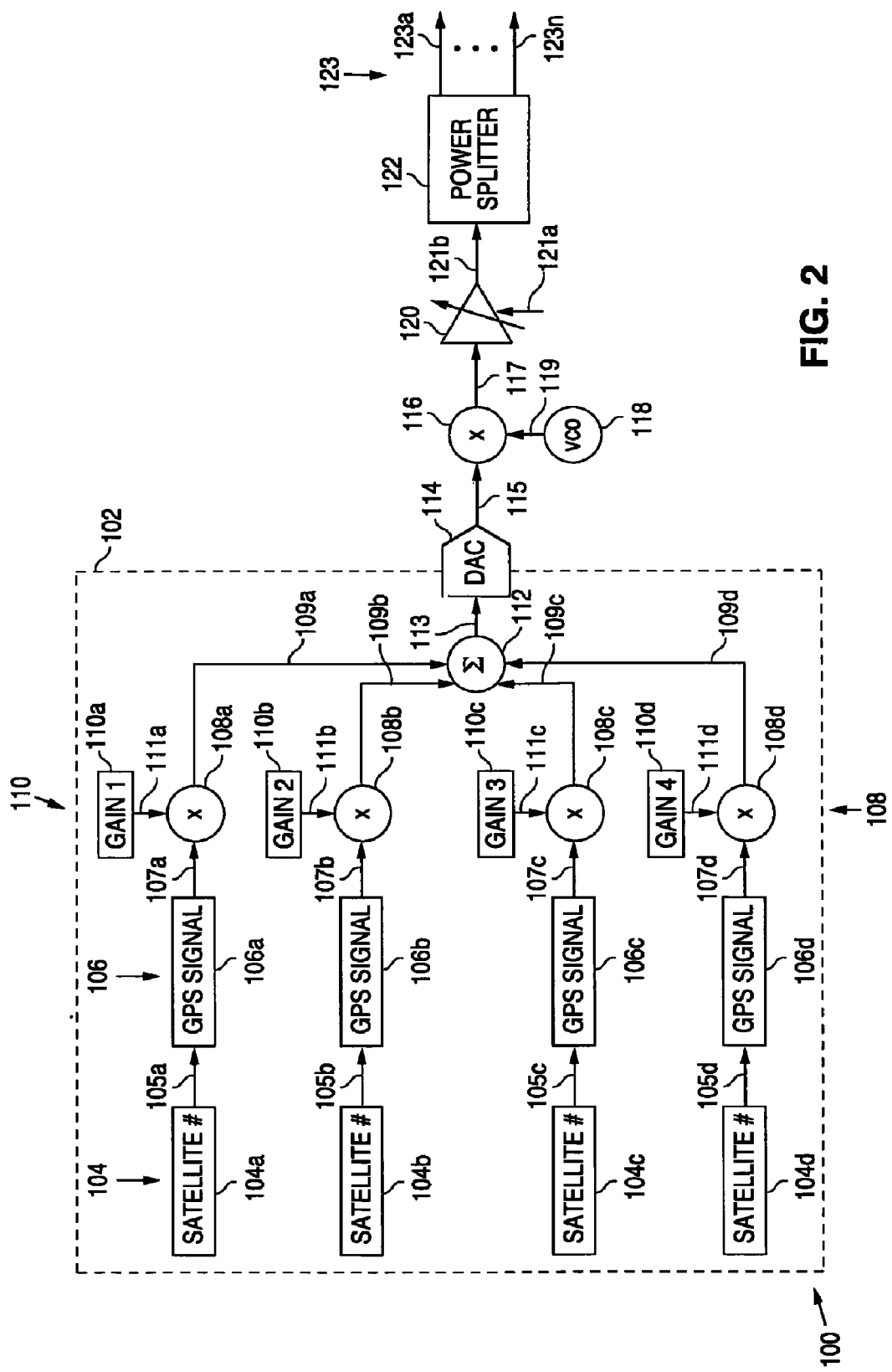
FIG. 2 is a block diagram of a test system using a shared RF signal generator for providing a test signal for multiple DUTs in accordance with one embodiment of the presently claimed invention.

Referring to FIG. 2, a test system for using an RF signal generator to provide a test signal for testing multiple DUTs in accordance with one embodiment of the presently claimed invention includes a test signal source 102 containing multiple digital code sources 104 (e.g., GPS signal codes), multiple digital signal generators 106 (e.g., GPS signal generators), multiple signal gain control circuits 108, multiple gain control signal sources 110, signal combining circuitry 112 and digital-to-analog conversion (DAC) circuitry 114, all interconnected substantially as shown (with "multiple" being four for purposes of this example). Each digital signal generator 106a, 106b, 106c, 106d, in accordance with its respective digital code signal 105a, 105b, 105c, 105d from its digital code source 104a, 104b, 104c, 104d, provides a respective digital baseband signal 107a, 107b, 107c, 107d. Each of these signals, 107a, 107b, 107c, 107d has its signal level (e.g., power) set by its respective gain control circuit 108a, 108b, 108c, 108d in accordance with a respective gain control signal 111a, 111b, 111c, 111d from its associated gain control signal source 110a, 110b, 110c, 110d. The resulting corresponding gain-controlled signals 109a, 109b, 109c, 109d are combined (e.g., summed) in the signal combining circuitry 112. The resulting combined signal 113 is converted by the DAC 114 to a corresponding analog signal 115.

This analog signal 115 is up-converted in frequency in a signal mixer 116 driven by a RF signal 119 provided by a local oscillator (e.g., voltage-controlled oscillator) 118. (In accordance with well known techniques, the mixer 116 can be a quadrature signal mixer in which the analog baseband signal 115 is mixed with quadrature oscillator signals 119 from the local oscillator 118, although other well known frequency up-conversion techniques can be used as well.) The resulting modulated RF signal 117 is amplified with amplifier circuitry 120 which can have a signal gain controlled in accordance with one or more gain control signals 121a to produce a gain-controlled RF signal 121b. This RF signal 121b can be provided to a power splitter 122 which provides multiple substantially equal (in power) RF signals 123a, ..., 123n suitable for testing multiple DUTs 16 (FIG. 1).

With such a test signal generator 102, when used as a GPS signal test source, it is possible to control each individual satellite signal power in the digital domain. With the signal power from this multi-channel signal generator 102 split among multiple test signals 123a, each individual DUT can look for a different satellite signal, each of which can have its relative power individually controlled. This allows each satellite signal to be received by a specific DUT to have the desired signal power.

Figures 1, 3:
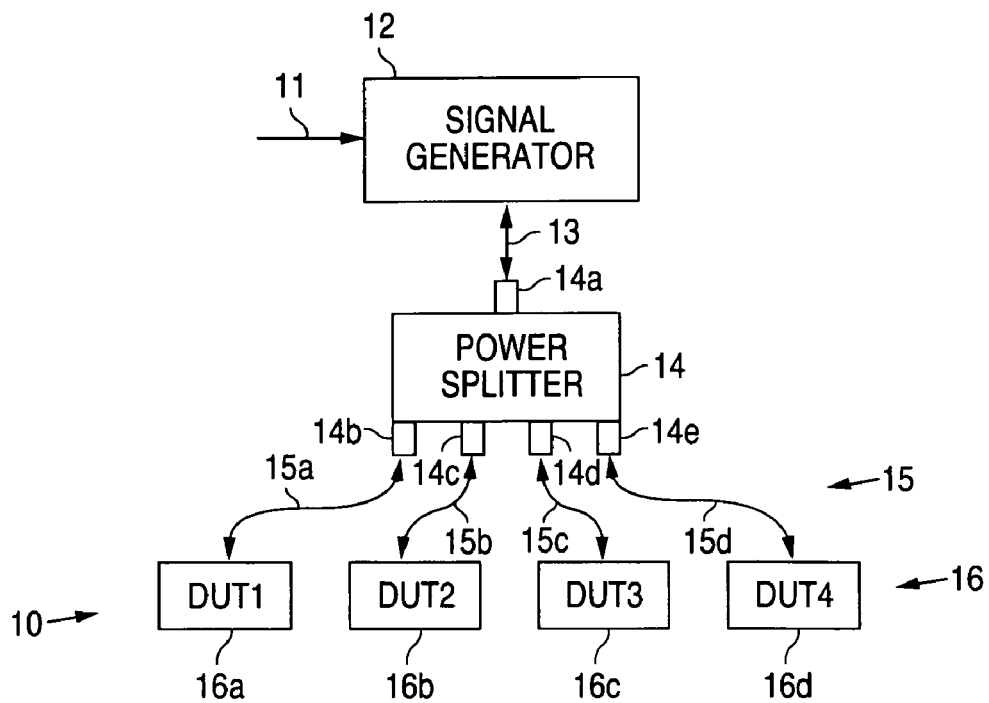
FIG. 1 is a block diagram of a conventional testing system for testing multiple DUTs with a single RF signal source.
FIG. 3 is a table of exemplary signal power levels and signal path attenuation values for the test system of FIG. 2.

Referring to FIG. 3, if the signal generator 102 is to be shared among four DUTs, the gain-controlled signals 109a, 109b, 109c, 109d can be individually controlled in power to ensure that each corresponding signal component within the RF test signals 123 has the appropriate power level to compensate for differences in signal path losses. For example, if DUT 1, DUT 2, DUT 3 and DUT 4 have signal path losses of 7.0, 7.5, 8.0 and 7.5 dB, respectively, and it is desired that each DUT receive a signal power of −145.0 dBm, then the gain control signals 111a, 111b, 111c, 111d can be set to establish the power levels of the gain-controlled signals, 109a, 109b, 109c, 109d such that their respective signal components within the RF test signals 123 have power levels of −138.0, −137.5, −137.0 and −137.5 dBm, respectively.

As will be readily appreciated, this allows the power of the individual test signals 109a, 109b, 109c, 109d to be set at levels providing compensation for different losses within the various signal paths to the individual DUTs. Hence, one need only determine the individual signal path loss to each DUT to determine the necessary adjustment, e.g., via the gain control signals 111a, 111b, 111c, 111d, for each individual source signal 109a, 109b, 109c, 109d.

Further, if the data signal sources 104 provide true satellite data and location information, it will be possible to perform lock tests on each DUT. While lock time may vary among the different DUTs due to slightly different power levels seen by each DUT, and may take longer than simple SNR testing, such testing can be performed in parallel as part of the same test. Additionally, since satellites are not truly stationary during actual use, individual clock signals or clock signal controls (to emulate satellite movements, e.g., by skipping clock cycles or introducing signal delays for selected clock signals) for the various data signal sources 104 and digital signal generators 106 would be needed for accurate testing of actual lock capabilities of the DUTs. However, if it is only necessary to test for individual satellite signals, which can be stationary in the sense that they are not tested relative to other satellite signals, a single system clock can be used.

Alternatively, notwithstanding what is generally a nominally equal power splitting provided by the power splitter 122, it is possible to test the DUTs at different relative signal powers. As discussed above, once the signal path losses are known for each DUT, the gain control circuits 108 can be controlled such that each individual gain-controlled signal 109a, 109b, 109c, 109d has a different signal power relative to the others. With dynamic control of the gain control signals 111a, 111b, 111c, 111d, multiple measurements can be made within each DUT for each of the GPS signal components, from which the data from each GPS signal can be measured and interpolated to determine an estimated CNR at a given input signal level. Further alternatively, with the different GPS signals at different power levels, it can be determined which of the GPS signals can be received and which cannot be received, thereby allowing the SNR to be measured for some signals but not for others, thereby providing for an estimation of the receiver noise figure.

Figure 4:
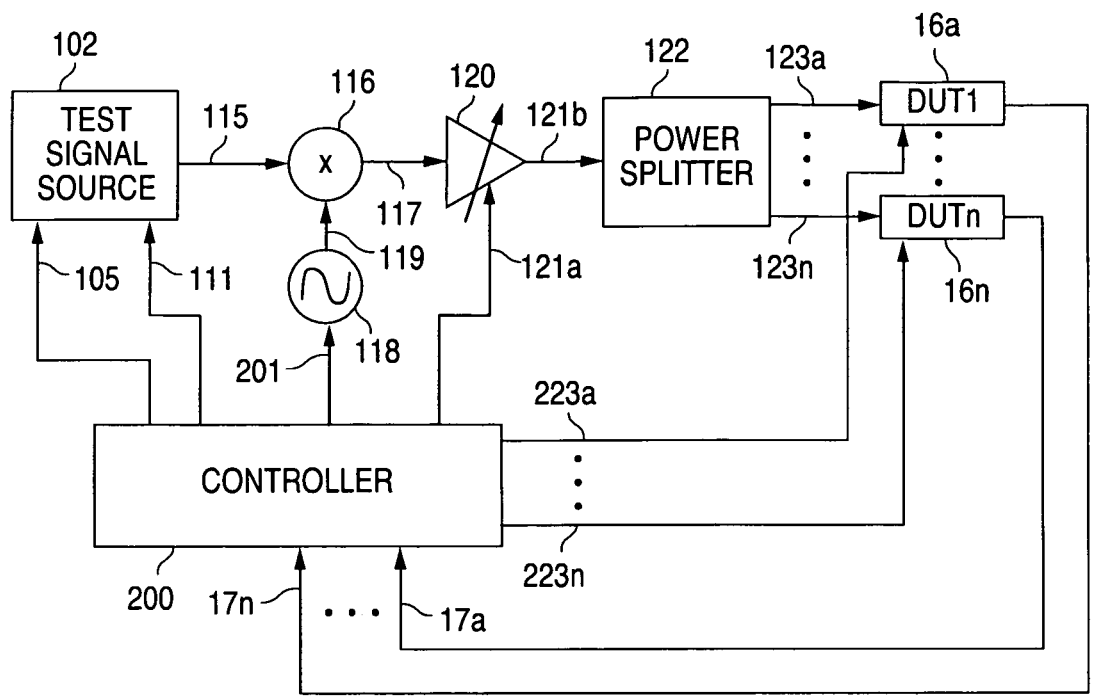
FIG. 4 is a block diagram of a test system using a test signal source for testing multiple DUTs in accordance with one embodiment of the presently claimed invention.

Referring to FIG. 4, testing multiple DUTs with a test signal source in accordance with one embodiment of the presently acclaimed invention can be achieved as described hereinbelow. The test signal source 102 can be provided its digital code signal 105 and its gain control signal 111 from a controller 200 (e.g., one or more personal computers programmed to provide the requisite codes, data, control signals and timing signals as discussed herein). The resulting analog signal 115, as discussed above, is frequency up-converted in a mixer 116 driven by the local oscillator signal 119. The local oscillator 118 can also receive one or more control signals 201 from the controller 200. The resulting modulated RF signal 117 is amplified by the amplifier circuitry 120 in accordance with its one or more gain control signals 121a (also received from the controller 200) to produce the RF signal 121b to be distributed via the power splitter 122.

Each distributed signal 123a, . . . , 123n is received by a respective DUT 16a, . . . , 16n, each of which is controlled by one or more respective control signals 223a, . . . , 223n from the controller 200. In accordance with these control signals 223a, . . . , 223n (discussed in more detail below), each DUT 16a, . . . , 16n provides a respective recovered data signal 17a, . . . , 17n containing the original transmitted information, e.g. GPS signal information.

Figure 5:
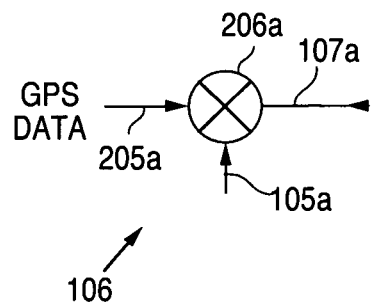
FIG. 5 is a schematic diagram of an exemplary embodiment of the digital signal generators of FIG. 2.

Referring to FIG. 5, the digital signal generators 106 can be implemented for operation as shown. The transmitted signal information, e.g., GPS data 205a, modulates the digital code 105a (e.g., a pseudo-random code in accordance with well known techniques), thereby producing an encoded signal 107a for transmission. As discussed above, this signal 107a, along with the remaining encoded signals 107b, 107c, . . . , following level setting in accordance with the gain control signals 111 (FIG. 2), are combined and converted to the analog signal 115.

Figure 6:
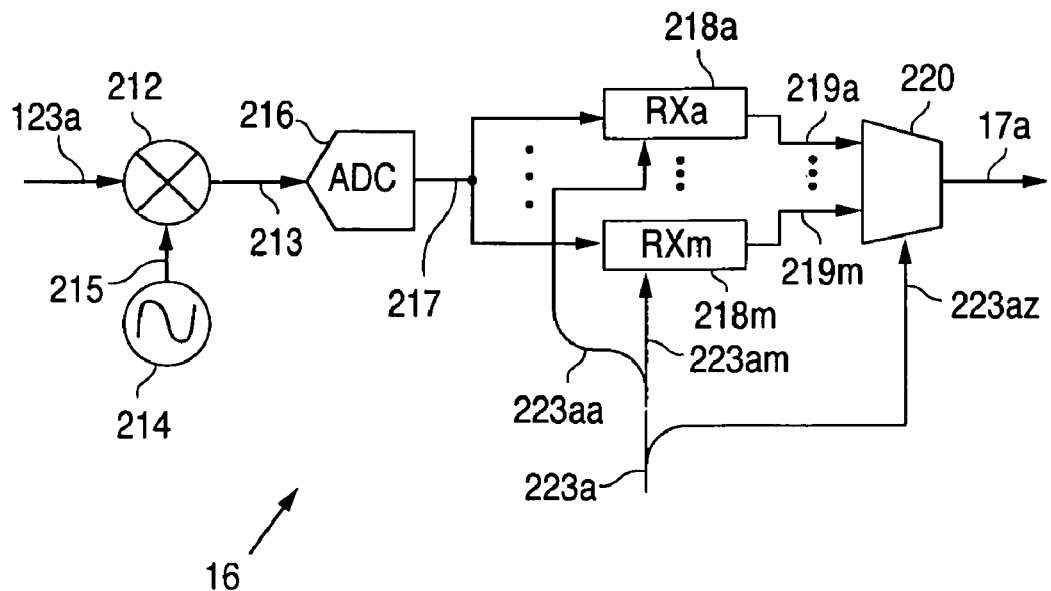
FIG. 6 is a block diagram of an exemplary embodiment of the DUTs of FIG. 1.

Referring to FIG. 6, each of the DUTs 16 can be implemented to include (among other elements or devices for performing additional functions) a signal mixer 212, a local RF signal source 214, an analog-to-digital converter (ADC) 216, multiple receiver circuits 218a, . . . , 218m, and an output signal router (e.g., multiplexor) 220, interconnected substantially as shown. The incoming RF signal 123a is frequency down-converted in the mixer 212 using the RF signal 215 from the local source 214. The resulting analog baseband signal 213 is converted by the ADC 216 to a digital signal 217 which is for reception and processing by each of the receiver circuits 218a, . . . , 218m (discussed in more detail below). The resulting recovered data signals 219a, 219m are routed (e.g., multiplexed) by the signal router 220 to provide the output data signal 17a. The control signals 223a from the controller (FIG. 4) includes respective control signals 223aa, . . . , 223am, 223az for controlling the individual receiver circuits 218a, . . . , 218m and signal router 220.

Figure 7:
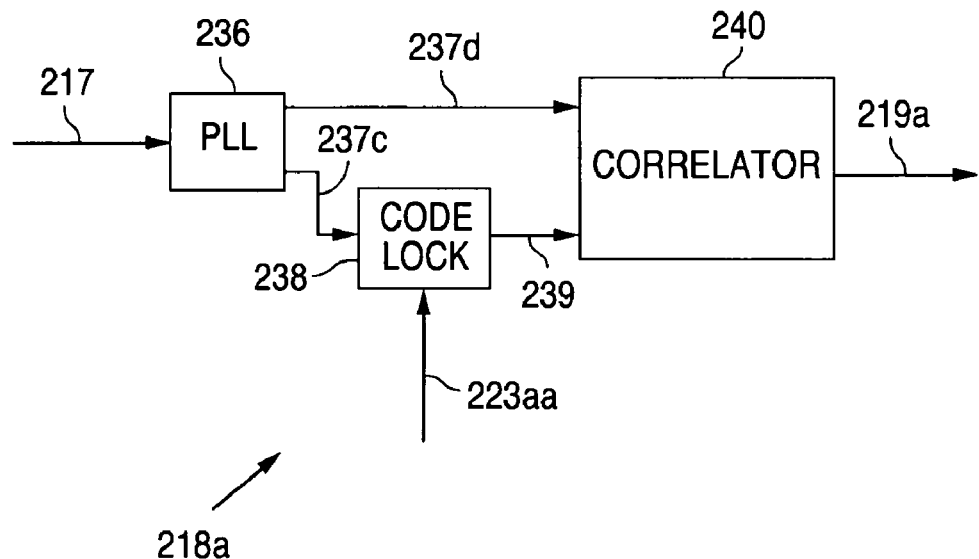
FIG. 7 is a block diagram of an exemplary embodiment of a receiver within a DUT.

Referring to FIG. 7, an exemplary embodiment of the receiver circuits 218a, . . . , 218m includes a phase-lock-loop (PLL) 236, code lock circuitry 238, and a signal correlator 240, interconnected substantially as shown. The incoming digital signal 217 from the ADC 216 (FIG. 6) drives the PLL circuit 236 which serves as a clock, or code, recovery circuit to produce a recovered code signal 237c corresponding to the original digital code 105a, and a recovered data signal 237d corresponding to the original data signal 205a (FIG. 5). The code lock circuitry 238, in accordance with control data 223aa, uses the recovered code signal 237c to phase lock its expected digital code 223aa. The resulting phase-locked expected code signal 239 is correlated with the recovered data signal 237d in accordance with well known techniques to produce the recovered data 219a (FIG. 6).

As will be readily appreciated by one of ordinary skill in the art, although the presently claimed invention has been described primarily in the context of GPS signal testing, other signal broadcast systems combining multiple streams of information in a single signal can also be tested in accordance with the system and techniques described herein by controlling the power of each individual data stream and measuring the bit error rate (BER) for each data stream.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a radio frequency (RF) signal generator for providing a test signal to be used in testing a plurality of RF signal receivers, comprising:
    signal generator circuitry responsive to a first plurality of digital baseband signals and a plurality of digital gain control signals by providing an analog baseband signal corresponding to a combination of said first plurality of digital baseband signals; and
    frequency conversion circuitry coupled to said signal generator circuitry and responsive to said analog baseband signal by providing a RF signal corresponding to said combination of said first plurality of digital baseband signals.

2. The apparatus of claim 1, wherein said signal generator circuitry comprises:
    digital signal generator circuitry responsive to said first plurality of digital baseband signals by providing a related second plurality of digital baseband signals;
    digital gain control circuitry coupled to said digital signal generator circuitry and responsive to said plurality of digital gain control signals and said second plurality of digital baseband signals by providing a related third plurality of digital baseband signals, wherein ratios of respective related ones of said second and third pluralities of digital baseband signals correspond to respective ones of said plurality of digital gain control signals; and
    signal conversion circuitry coupled to said digital gain control circuitry and responsive to said third plurality of digital baseband signals by providing said analog baseband signal.

3. The apparatus of claim 2, wherein said digital gain control circuitry comprises digital signal multiplication circuitry responsive to said plurality of digital gain control signals and said second plurality of digital baseband signals by providing a plurality of digital product signals as said related third plurality of digital baseband signals.

4. The apparatus of claim 2, wherein said signal conversion circuitry comprises:
    signal summing circuitry responsive to said third plurality of digital baseband signals by providing a digital sum signal; and
    digital-to-analog conversion (DAC) circuitry coupled to said signal summing circuitry and responsive to said digital sum signal by providing said analog baseband signal.

5. The apparatus of claim 1, further comprising analog amplifier circuitry coupled to said frequency conversion circuitry and responsive to said RF signal and a gain control signal by providing a corresponding amplified RF signal having a magnitude related to said gain control signal.

6. The apparatus of claim 1, further comprising signal dividing circuitry coupled to said frequency conversion circuitry and responsive to said RF signal by providing a plurality of corresponding RF signals.

7. The apparatus of claim 1, further comprising:
    analog amplifier circuitry coupled to said frequency conversion circuitry and responsive to a gain control signal and said RF signal by providing a corresponding amplified RF signal having a magnitude related to said gain control signal; and
    signal dividing circuitry coupled to said analog amplifier circuitry and responsive to said amplified RF signal by providing a plurality of corresponding RF signals.

8. An apparatus including an analog data signal generator for providing a test data signal to be used in testing a plurality of data signal receivers, comprising:
    a plurality of digital signal generator circuits responsive to a plurality of digital code signals by providing a first plurality of digital baseband signals;
    a plurality of digital gain control circuits coupled to said plurality of digital signal generator circuits and responsive to said first plurality of digital baseband signals and a plurality of digital gain control signals by providing a second plurality of digital baseband signals, wherein ratios of respective related ones of said first and second pluralities of digital baseband signals correspond to respective ones of said plurality of digital gain control signals;
    digital signal combining circuitry coupled to said plurality of digital gain control circuits and responsive to said second plurality of digital baseband signals by providing a digital combination signal related to said second plurality of digital baseband signals; and
    digital-to-analog conversion (DAC) circuitry coupled to said digital signal combining circuitry and responsive to said digital combination signal by providing an analog baseband signal related to a combination of said digital code signals.

9. The apparatus of claim 8, further comprising frequency conversion circuitry coupled to said DAC circuitry and responsive to said analog baseband signal by providing a RF signal related to said combination of said digital code signals.

10. The apparatus of claim 9, further comprising analog amplifier circuitry coupled to said frequency conversion circuitry and responsive to said RF signal and a gain control signal by providing a corresponding amplified RF signal having a magnitude related to said gain control signal.

11. The apparatus of claim 9, further comprising signal dividing circuitry coupled to said frequency conversion circuitry and responsive to said RF signal by providing a plurality of corresponding RF signals.

12. The apparatus of claim 9, further comprising:
    analog amplifier circuitry coupled to said frequency conversion circuitry and responsive to said RF signal and a gain control signal by providing a corresponding amplified RF signal having a magnitude related to said gain control signal; and
    signal dividing circuitry coupled to said analog amplifier circuitry and responsive to said amplified RF signal by providing a plurality of corresponding RF signals.

13. A method for providing a test data signal for testing a plurality of data signal receivers, comprising:
    receiving a first plurality of digital codes and in response thereto providing a first plurality of digital baseband signals each of which is related to a respective one of said first plurality of digital codes;

receiving said first plurality of digital baseband signals and a plurality of digital gain control signals and in response thereto providing a second plurality of digital baseband signals, wherein ratios of respective related ones of said first and second pluralities of digital baseband signals correspond to respective ones of said plurality of digital gain control signals;

combining said second plurality of digital baseband signals to provide a digital combination signal related to said second plurality of digital baseband signals; and converting said digital combination signal to one or more RF signals, wherein each of said one or more RF signals includes a plurality of RF signal components related to said first plurality of digital codes;

converting, with each one of a plurality of data signal receivers, a respective one of said one or more RF signals to a respective one of one or more converted digital baseband signals related to said digital combination signal; and decoding, with each one of a plurality of data signal receivers, a respective one of said one or more converted digital baseband signals to retrieve a respective one of said first plurality of digital codes.

14. The method of claim 13, wherein:

each of said first plurality of digital codes corresponds to a respective one of a plurality of global positioning system (GPS) satellites; and said receiving a first plurality of digital codes and in response thereto providing a first plurality of digital baseband signals comprises providing a plurality of GPS signals.

15. The method of claim 13, wherein said receiving said first plurality of digital baseband signals and a plurality of digital gain control signals and in response thereto providing a second plurality of digital baseband signals comprises digitally scaling each one of said first plurality of digital baseband signals in relation to a respective one of said plurality of digital gain control signals.

16. The method of claim 13, wherein said combining said second plurality of digital baseband signals to provide a digital combination signal related to said second plurality of digital baseband signals comprises digitally summing second plurality of digital baseband signals.

17. The method of claim 13, wherein said converting said digital combination signal to one or more RF signals comprises frequency modulating a transmitter RF signal with said digital combination signal.

18. The method of claim 13, wherein said converting, with each one of a plurality of data signal receivers, a respective one of said one or more RF signals to a respective one of one or more converted digital baseband signals related to said digital combination signal comprises frequency demodulating said respective one of said one or more RF signals.

19. The method of claim 13, wherein said decoding, with each one of a plurality of data signal receivers, a respective one of said one or more digital baseband signals to retrieve a respective one of said first plurality of digital codes comprises correlating a respective one of said one or more digital baseband signals with a respective one of a second plurality of digital codes.

* * * * *